United States Patent [19]

Hanson et al.

[11] Patent Number: 4,865,154

[45] Date of Patent: Sep. 12, 1989

[54] MUFFLER WITH DRAIN HOLES

[75] Inventors: Roger D. Hanson, Jackson; William E. Hill, Ann Arbor, both of Mich.

[73] Assignee: Tennessee Gas Pipeline Company, Lincolnshire, Ill.

[21] Appl. No.: 249,504

[22] Filed: Sep. 26, 1988

[51] Int. Cl.⁴ .......................... F01N 1/08; F01N 7/18
[52] U.S. Cl. ...................................... 181/282; 181/228; 181/231; 181/260; 181/272
[58] Field of Search .................. 181/228, 231-233, 181/236, 243, 244, 247, 253, 255, 259, 260, 272, 273, 276, 282

[56] References Cited

U.S. PATENT DOCUMENTS

| | | | |
|---|---|---|---|
| 2,241,768 | 5/1941 | Derener | 181/244 |
| 2,437,446 | 3/1948 | Stephens | 181/276 |
| 2,484,816 | 10/1949 | Culbert | 181/260 |
| 3,036,654 | 5/1962 | Powers | 181/266 |
| 3,283,847 | 11/1966 | Kerns et al. | 181/245 |
| 3,638,756 | 1/1972 | Thiele | 181/245 |
| 4,527,659 | 7/1985 | Harrington | 181/244 |
| 4,759,423 | 7/1988 | Harwood et al. | 181/282 |

FOREIGN PATENT DOCUMENTS 2148390  5/1985  United Kingdom ............... 181/244

Primary Examiner—B. R. Fuller
Attorney, Agent, or Firm—Harness, Dickey & Pierce

[57] ABSTRACT

A flat, box-like muffler formed of metal upper and lower housing sections and internal gas passage defining plates has drainage holes to allow liquid that collects on the top of the muffler or on the bottom of the lower section inside the housing to drain out of the muffler. A special sound attenuation structure comprising passages pressed in the plates and support channels in the housing sections is shown.

16 Claims, 2 Drawing Sheets

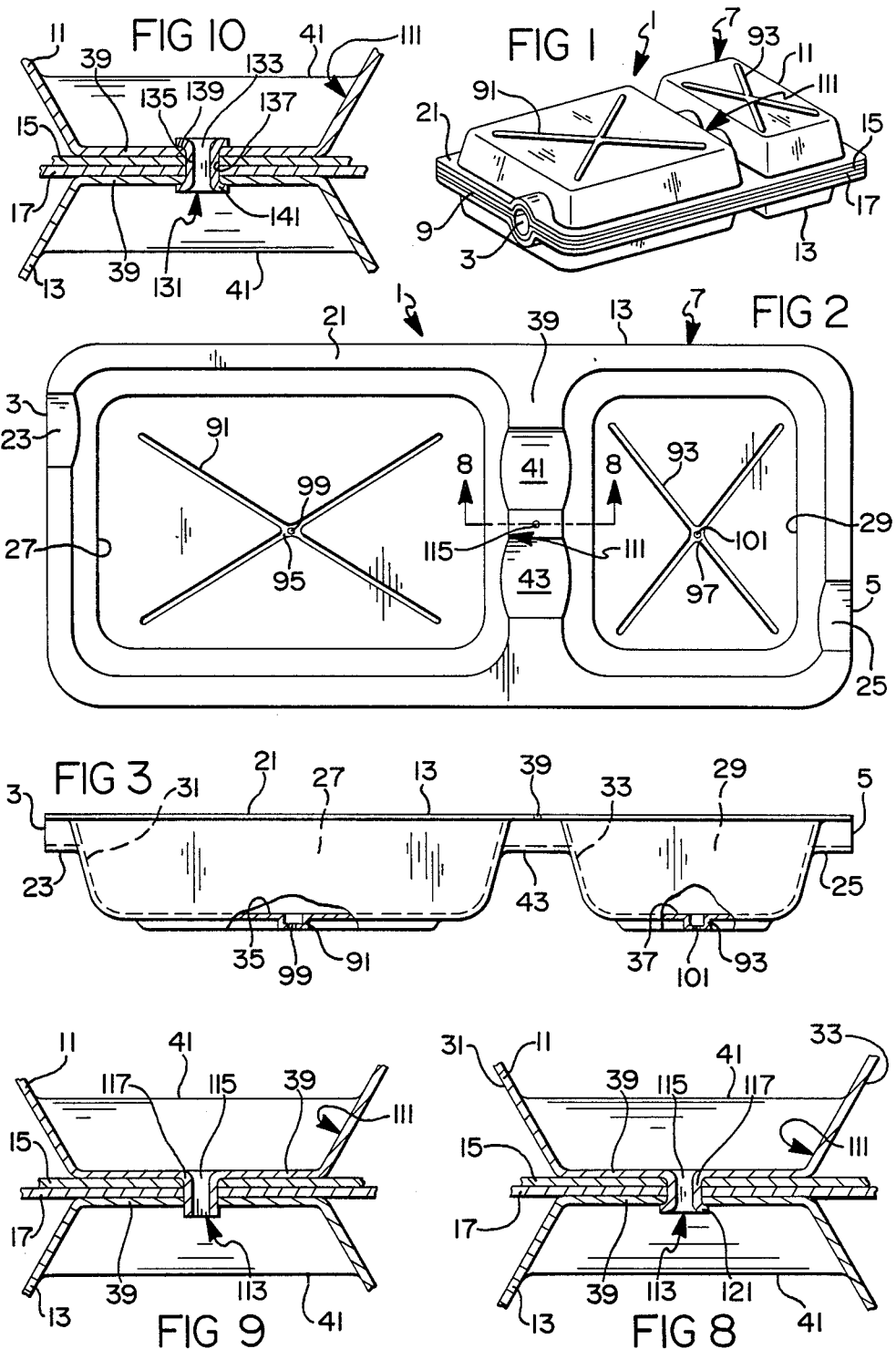

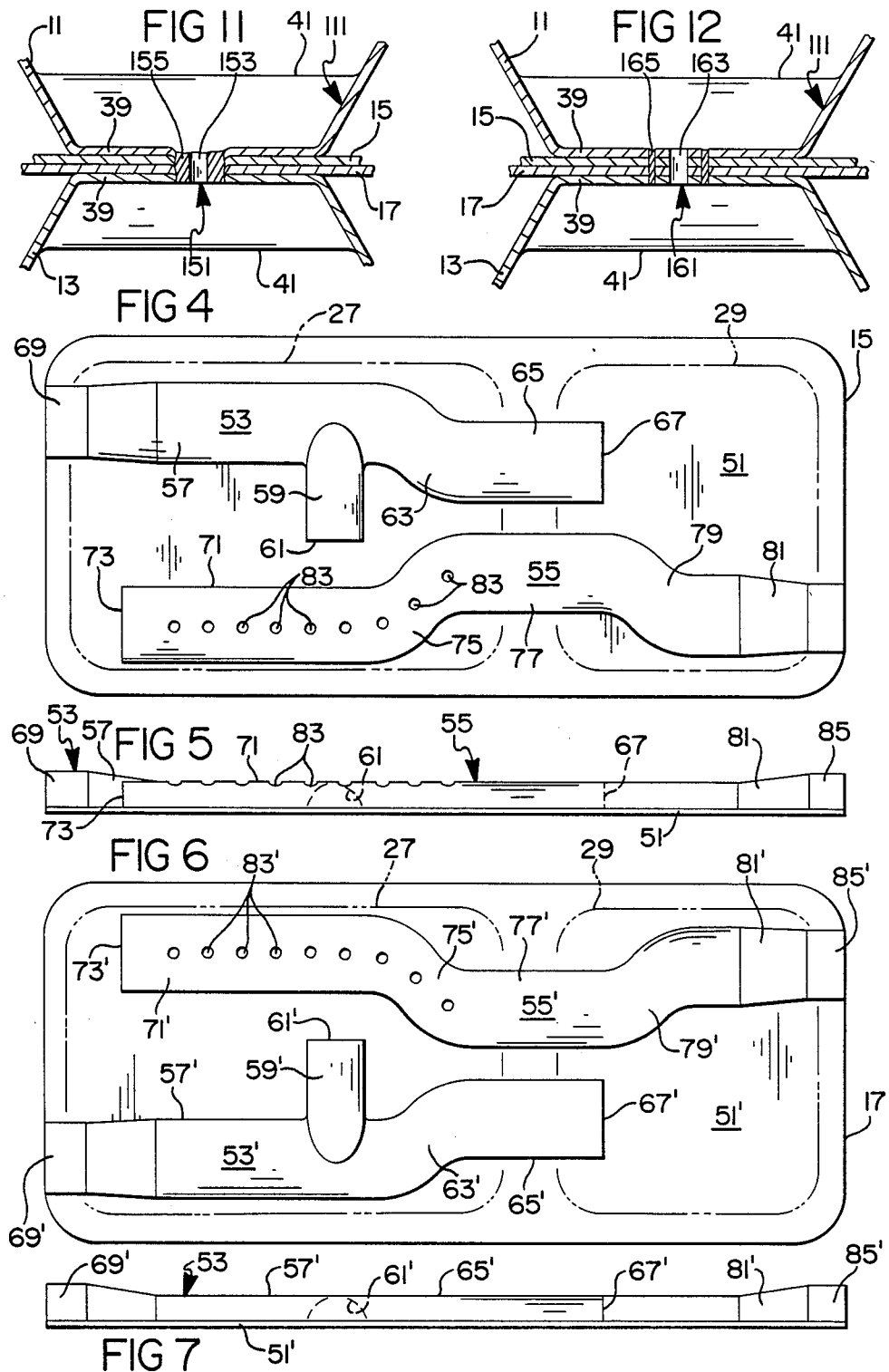

MUFFLER WITH DRAIN HOLES

This invention relates to sound attenuation mufflers for use in automotive exhaust gas systems and the like.

BACKGROUND OF THE INVENTION

Flat, box-like muffler configurations, such as shown in U.S. Pat. No. 4,700,806, issued October 20, 1987, are at increased risk of failure from the action of corrosive liquids collecting on flat exterior and interior surfaces. Water from wet and snowy pavements, for example, and even road salt may collect in certain areas on top of the muffler and rapidly corrode the metal. Acidic liquid that condenses from the exhaust gases inside the muffler may collect on flat bottom surfaces and produce premature corrosive failure.

BRIEF SUMMARY OF THE INVENTION

It is a basic purpose of the invention to reduce the risk of corrosive failure of flat, box-like muffler configurations.

The invention accomplishes this purpose by providing drainage means to allow escape of corrosive liquid that collects on the outside and/or inside of the muffler.

The drainage means of the invention allows the escape of liquid from pockets on top of the muffler by providing a drainage hole that extends vertically through all metal layers of the muffler whereby the liquid flows by gravity to the ground below. The drainage means is of such a nature that it seals and unites the metal layers thereby enhancing the integrity and strength of the muffler.

The drainage means of the invention allows the escape of liquid that condenses inside of a chamber in the muffler by providing an arrangement of embossments in the bottom of the chamber to facilitate collection of the condensate in one location and providing a vertical drainage hole at this location whereby the liquid flows by gravity to the ground below. The arrangement of embossments has the added advantage of stiffening the metal to reduce vibration of the muffler wall.

Other features and advantages of the invention including a useful sound attenuation structure are described hereinafter.

DESCRIPTION OF THE DRAWINGS

FIG. 1 is a perspective view of a muffler for an automotive exhaust system of a type embodying the invention;

FIG. 2 is an enlarged bottom plan view of the muffler of FIG. 1;

FIG. 3 is a side elevation partly broken away of the bottom half of the outer shell of the muffler of FIGS. 1 and 2;

FIG. 4 is a top plan view on an enlarged scale of an upper gas passage plate that may be used in the muffler of FIGS. 1–3;

FIG. 5 is a side elevation of the plate of FIG. 4;

FIG. 6 is a bottom plan view of a lower gas passage plate that may be used with the plate of FIGS. 4 and 5, this plate being a mirror image of the plate of FIGS. 4 and 5;

FIG. 7 is a side elevation of the plate of FIG. 6;

FIG. 8 is an enlarged cross section along line 8—8 of FIG. 2 showing one form of hole for external drainage of the muffler of FIG. 1;

FIG. 9 is a section similar to that of FIG. 8 showing a stage in the formation of the drain hole of FIG. 8;

FIG. 10 is a section similar to FIG. 8 but shows a different drain hole construction;

FIG. 11 is a section similar to FIGS. 8 and 10 but shows another drain hole construction; and FIG. 12 is a section similar to that of FIGS. 8, 10, and 11 but shows still another drain hole construction.

DETAILED DESCRIPTION OF EMBODIMENTS OF THE INVENTION

FIGS. 1 and 2 show an automotive exhaust system muffler 1 having a gas inlet 3 at one end for connection to an exhaust pipe of an exhaust system and a gas outlet 5 at the other end for connection to a tailpipe of an exhaust system. The muffler 1 is of a flat, box-like configuration and has an outer housing or shell 7, in which the inlet and outlet are formed, and an inner member 9 (FIG. 1) located inside of the outer shell and cooperating with it to provide a sound attenuating passage for exhaust gas to flow from the inlet 3 to the outlet 5. The outer shell 7 comprises upper and lower rectangular pan-shaped halves 11 and 13, respectively, and the inner member 9 comprises upper and lower generally rectangular, flat gas passage plates 15 and 17, respectively. In the muffler 1 the upper and lower outer shell halves 11 and 13 are substantially mirror-images of each other; and the upper and lower gas passage plates 15 and 17 are substantially mirror images of each other. When installed in a vehicle exhaust system, the muffler will ordinarily be parallel to the ground and underside of the vehicle with the half 11 on the top and the half 13 on the bottom, facing the ground.

The shell halves 11 and 13 and the gas passage plates 15 and 17 are preferably stamped or power press formed from flat strips or sheets of metal, ordinarily low carbon steel or stainless steel. Referring to the halves 11 and 13 and more particularly to the bottom half 13 as seen in FIG. 3, the half 13 (and also half 11) is substantially rectangular in plan view and has an outer flange 21 around all four sides which is flat except for the portions 23 and 25 at the inlet 3 and outlet 5. The flat outer flange 21 remains from the flat metal bank in which the final shape of half 13 is formed. This shape includes two drawn pan-shaped rectangular cups or recesses 27 and 29 of rectangular cross sections having tapered sidewalls 31 and 33, respectively, and flat bottoms 35 and 37, respectively, parallel to the flange 21. The recesses or cups 27 and the recesses or cups 29 provide sound attenuation chambers in the assembled muffler. Cup 27 is larger than cup 29 and the two cups are separated by a section 39 extending transversely across the width of the half 13, being substantially coplanar with the flat outer flange 21 and remaining with it as a part of the original flat metal blank from which the half 13 was formed. The transverse section 39 is flat but includes two drawn substantially semi-cylindrical channel sections 41 and 43 connecting cups 27 and 29 and which may be drawn at the same time with them in the press forming process. The inlet and outlet forming portions 23 and 25 in the outer flange 21 are also substantially semi-cylindrical and may also be drawn at the same time as cups 27 and 29 and sections 41 and 43. The channels 41 and 43 are parallel to each other and to portions 23 and 25 but are spaced inwardly from the longitudinal side edges of the muffler by greater distances than the portions in order to facilitate drawing of the metal in the press forming operation during manufacture of the shell halves and produce a more favorable stress condition in the metal. It is understood that the upper half 11 has the same structure and is made the same way as the lower half 13 described above.

Referring to the inner member 9 as formed by the gas passage plates 15 and 17, in the embodiment shown these are complemental and mirror images of each other and primed upper plate reference numbers (FIGS. 4–5) are used for the bottom plate (FIGS. 6–7). They are of the same construction and made the same way, i.e. stampings referred to as "pancakes" in the field. See Walter H. Powers U.S. Pat. No. 2,998,093, issued August 29, 1961.) The flat sheet or strip 51 from which the gas passage plate 15 is formed has a substantially semi-circular trough defining inlet passage 53 and a substantially semi-circular trough defining outlet passage 55 press formed in it, both passages being on the upper side of the plate 15. Conversely, passages 53' and 55' will be on the lower side of bottom plate 17. When the two plates are put together the passages 53 and 53' will unite to form a substantially cylindrical inlet passage and the passages 55 and 55' will unite to form a substantially cylindrical oulet passage. As seen in FIGS. 1 and 2, when viewed from the top, the inlet 3 is in the left end of the housing 7 adjacent the right side of the housing while the outlet 5 is in the right end of the housing 7 adjacent the left side of the housing.

The inlet passage 53 comprises a straight inlet section 57 extending parallel to the length of the plate 15 and adjacent the right side of the muffler and an outlet or discharge section 59 extending transversely to the section 57 and the longitudinal sides of the plate. The plate metal is slit or sheared at 61 in press forming to form a semi-circular opening for gas to leave the section 59. The passage 53 has an inwardly offset section 63 just downstream from section 59 and then a straight section 65 extending parallel to section 57 but spaced inwardly from it. Section 65 is located to fit in channel 41 of the outer shell. The plate metal is slit or sheared at 67 to form a semi-circular opening for gas to pass through the end of the section 65. The inlet end of passage 53 is semi-cylindrically shaped at 69 to fit portions 23 of outer shells 11 and 13.

The outlet passage 55 has a straight inlet section 71 adjacent the left side of the muffler that is parallel to section 57 of inlet passage 53 and overlaps it and the outlet section 59. The plate metal is slit or sheared at 73 to form a semi-circular opening in pressing of the plate for gas to enter the end of section 71. The passage 55 has an inwardly offset section 75 just downstream of section 71 and then a straight section 77 extending parallel to straight section 65 of the inlet passage 53 and the sides of the muffler. Section 77 is located to fit in channel 43 of the halves 11 and 13 forming the outer shell. At the end of section 77 there is an outwardly offset section 79 and then a straight outlet section 81 extending parallel to the length of the plate 15 and sides of the muffler. Holes 83 are pierced in the plate 15 in the sections 71 and 75 as illustrated. The outlet end of passage 55 is semi-cylindrically shaped at 85 to fit outlet 5 forming portions 25 of the housing sections 11 and 13.

As indicated, at assembly of the parts so far described, the upper and lower plates 15 and 17 are placed together to form the tubular inlet and outlet gas flow passages 53 and 55. The two plates are placed on the peripheral flange 21 of the bottom half 13 of the housing 7 so that the inlet passage 53 fits in portion 23 and outlet passage 55 fits in portion 25. At the same time, inlet passage section 65' will fit in channel 41 and outlet passage section 77' will fit in channel 43 of the lower half 13. The top half 11 is placed on top of the plates 15 and 17 and the lower half 13 so that its flange 21 is on the outer periphery of upper plate 15. The upper and lower flanges 21 and the upper and lower plates are secured in a gas tight manner to each other by welding or the equivalent.

When assembled in this way, inlet passage 53 extends completely through upper and lower chambers 27 and opens at 67 into upper and lower chambers 29. The outlet passage 55 extends completely through upper and lower chambers 29 but opens near the left end of the muffler at 73 and through longitudinally spaced holes 83 into upper and lower chambers 27. The transverse section 59 of inlet passage 53 opens at 61 into a mid-portion of upper and lower chambers 27. If desired, openings (not shown) may be formed in both the upper and lower plates 15 and 17 to more fully connect the upper and lower chambers 27 to each other and/or to more fully connect the upper and lower chambers 29 to each other. As will be seen hereinafter, the chambers 27 function as an expansion chamber means through which gas flows from the inlet passage 53 to the outlet passage 55 and the chambers 29 function as a resonator chamber means connected through opening 67 and imperforate tubular sections 65 and 63 to the main gas stream flowing from inlet section 57 into transverse section 59.

As already indicated, muffler 1 has a substantially horizontal position in use with the bottom shell half 13 substantially parallel to and just above the ground. According to the invention, vertically extending drainage holes are included in the construction to provide for escape of liquid condensate from inside the muffler and for escape of water that may collect outside and on top of the muffler.

Referring to FIGS. 1–3, the bottom walls 35 and 27 in chambers 27 and 29 are preferably embossed in the pressing operation to increase their resistance to vibration and "oilcanning". This is shown as an X-shaped rib configuration 91 in wall 35 and an X-shaped rib configuration 93 in wall 37. To provide for collection and drainage of corrosive liquid that condenses in the muffler 1, the rib configurations 91 and 93 in at least the bottom shell 13 are pressed outwardly of the plane of the bottom walls 35 and 37, and to simplify production the rib configurations in the upper shell 11 are preferably also pressed outwardly so that it is identical. The ribs of configuration 91 intersect in a section 95 and the ribs of configuration 93 intersect in a section 97. Holes 99 and 101 are punched, pierced, drilled, or otherwise formed in the intersections 95 and 97, respectively. Liquid condensate in the muffler will move around with movement of the vehicle and tend to collect in the rib configurations 91 and 93 so that the holes 99 and 101 provide drainage means for condensate to escape by gravity flow so that it falls on the ground below the vehicle.

According to the invention, drainage means is provided for water or liquid tending to collect in the pocket 111 (FIG. 2) formed on outside flat surface 39 by the channles 41 and 43 and by the walls 31 and 33 of chambers 27 and 29. Road salt may also collect in the pocket 111 to significantly increase the corrosive potential of water that collects there. Drainage of liquid from pocket 111 will tend to eliminate or minimize corrosion at that area of the muffler.

Referring first to FIGS. 8 and 9, the drainage means 113 provides a hole 115 that extends through all four layers of metal below the bottom of pocket 111. Thus, liquid on the top of the muffler can simply move by gravity through the laminate and fall to the ground below. The drainage means 113 of FIGS. 8 and 9 comprises a tube 117 which is extruded from the flat section 39 of upper shell half 11, as shown in FIG. 9, to extend through registering holes in the other three metal layers. The end of the tube 117 extends beyond the bottom surface of the bottom layer 39 and, as shown in FIG.8, is flared outwardly into an annular flange 129 that tightly presses against the bottom of layer 39. The tube 117 therefore seals the four layers at the site of drainage against gas or water leakage and also serves as a clamping or connection means for securing the layers tightly together.

Referring to FIG. 10, the drainage means 131 provides a hole 133 that extends through the four metal layers. This drainage means comprises a hollow or tubular rivet 135 which extends through registering holes 137 in the four layers and has opposite ends outwardly flared into upper and lower annular flanges 139 and 141, respectively, that securely clamp the four layers together. The rivet 135 also serves to seal the laminate to a substantial extent against liquid infiltration or gas escape.

Referring to FIG. 11, the drainage means 151 provides a hole 153 that extends through the four metal layers. The means 151 comprises a spotweld which tends to coin or compress the metal layers together as illustrated and to melt and fuse a cylindrical plug 155 through the four layers. Thereafter, the hole 153 is punched or drilled through the spotweld plug 155. The spotweld therefore not only provides the drainage hole but also seals the edges of the laminate and unites the four layers of metal.

Referring to FIG. 12, the drainage means 161 comprises a hole 163 that extends through the four metal layers. The means 161 comprises an integral fused sleeve 165 of melted and hardened metal extending through the four layers of metal that serves to unite and seal them together. This sleeve can be formed by a laser beam which will heat the metal in the localized area to the degree that it will fuse or weld together. The beam can then be focused more narrowly and its energy increased whereby it will form or burn out the hole 163 extending through the four layers.

In operation as a sound-attenuating exhaust muffler, exhaust gas from an exhaust pipe (not shown) will enter the muffler 1 through the inlet 3 which receives a downstream end of the exhaust pipe. It flows into the inlet passage 53 in member 9 and can communicate in this passage by way of openings 61 and 61' with the upper and lower portions of resonator chamber 27 or flow by way of openings 67 and 67' into upper and low portions of expansion chamber 29. Openings 67 and 67' are the only inlet and outlet to chambers 29 and the volume of these chambers as well as the length and area of passage sections 65 and 63 may be selected to enable the combined chambers and passages to act as a Helmholtz resonator tuned to attenuate a predetermined sound frequency.

All gas entering the muffler flows through transverse sections 59 and 59' to enter upper and lower portions of expansion chamber 27. This gas can reach outlet passage 55 through openings 73 and 73' and through perforations 83 and 83'. It flows through sections 71 and 71', 77 and 77', and 81 and 81' to reach outlet 5 of the muffler which ordinarily is connected to the tailpipe (not shown) of the vehicle exhaust system.

As gas flows through the muffler, the resonator chamber 29 functions to attenuate the most objectionable low sound frequency while the expansion chamber 27 and gas passage arrangements in it function to attenuate the medium to high frequencies and some of the low frequencies. The perforations 83 and 83' act, in particular, to attenuate high frequencies.

In use of the muffler on a vehicle wherein the bottom of lower shell 13 would ordinarily be above and parallel to the ground, condensate will eventually form and collect in the lower parts of chambers 27 and 29. Resonator chamber 29, in particular, will collect and retain condensate since it operates at a relatively low temperature due to the fact that the gas stream does not flow through it. Condensate in these chambers flows to the collection pockets provided by rib configurations 91 and 93 and into drain holes 99 and 101 where it can fall to the ground.

Water can collect in the outside pocket 111 on the top of the muffler. It is able to flow through drainage means that provide the various openings 115, 133, 153 or 163 to fall on the ground. Thus the pocket area 111 is kept relatively free of collected water or salt water.

It will be recognized that the invention has provided drainage means to suit the particular needs of flat, boxlike muffler configurations such as that of muffler 1. The invention has also provided a desirable plate-pressed gas flow passage cooperating with plate-pressed expansion and resonator chambers to provide sound attenuation for the exhaust gas system of an automotive type motor vehicle having a combustion engine. Modifications may be made in the specific structure shown and described without departing from the spirit and scope of the invention. For example, it may be desired to use only one plate 15 or 17 to define the gas passage means and in this case the drainage means illustrated for pocket 111 would extend through only three layers of metal.

What is claimed is:

1. A muffler comprising an outer shell with an inlet and oulet for exhaust gas and having upper and lower sections formed of sheet metal, internal gas passage means for flow of exhaust gases within the shell connecting the inlet and outlet and comprising upper and lower plates formed of sheet metal and in contact with one another, said upper and lower plates having channels pressed therein extending parallel to one another and extending upwardly from the upper plate and downwardly from the lower plate, said upper shell section having chambers with sidewalls formed therein located respectively at opposite ends of the channels in the upper plate, said lower shell section having chambers with sidewalls formed therein located respectively at opposite ends of the channels in the lower plate, said upper and lower shell sections having channels formed therein connecting the chambers formed therein and said channels in the shell sections receiving the channels in the plates, said channels being spaced apart and the space between the channels and the sidewalls of the chambers formed in the upper section defining a pocket, and means providing a drain hole for the pocket extending through the metal of the upper and lower shell sections and the upper and lower plates whereby liquid collecting in the pocket can drain from a top side of the muffler out of a bottom side of the muffler.

2. A muffler for exhaust gas from a vehicle engine comprising a sheet metal shell having an upper half and a lower half, said upper half and lower half fitting together and having an inlet and and outlet for exhaust gas, internal gas passage forming means inside the shell for flow of exhaust gases within the shell and providing for gas flow from said inlet to said outlet, and comprising upper and lower sheet metal plates with troughs therein, said upper and lower halves defining at least one chamber, said troughs in said upper and lower plates defining gas passages opening into said chamber, at least the lower of said shell halves having outwardly embossed rib means formed therein in said chamber to act as a pocket to collect condensate, and a drain hole formed in a central portion of said rib means whereby condensate in the chamber and pocket can escape from the muffler through the drain hole.

3. An exhaust muffler for use in automotive exhaust systems and mounted underneath the body of the automobile, said muffler comprising an outer housing having an inlet for exhaust gas and an outlet for exhaust gas, gas passage means inside of the housing providing for flow of gas from the inlet to the outlet of the housing, said outer housing and said gas passage means being made of sheet metal and constructed and arranged to act together as a structure to provide sound attenuation means for the attenuation of sound in the exhaust gas as said gas passes from the inlet to the outlet, said outer housing having generally flat top and bottom surfaces extending substantially horizontally below a bottom portion of the automobile body and above the ground, said sound attenuation means having a structure producing a pocket in a top portion of the outer housing capable of collecting water, and water draining means for draining water from said pocket including a vertical hole extending through the top and bottom surfaces of the housing and through portions of the gas passage means located in alignment with said hole, said water drainage means providing for sealing of the outer housing and of the gas passage means to block gas flow into the hole.

4. A muffler as set forth in claim 3 wherein said water drainage means serves to secure the housing to the gas passage means.

5. A muffler as set forth in claim 3 wherein said housing and said gas passage means have at least three contacting layers of metal at said pocket, said water drainage means serving to secure the contacting layers in contact with one another and to seal the joints between the layers.

6. A muffler as set forth in claim 5 wherein said contacting layers include a top layer and a bottom layer and said water drainage means comprises a downwardly extending vertical tube formed in the top layer of the contacting metal layers, said tube having a lower end and extending through all the layers below the top layer and having a flange at its lower end pressed against a bottom surface of the bottom layer.

7. A muffler as set forth in claim 3 wherein said housing and said gas passage means have four connecting layers of metal at said pocket and include a top layer and a bottom layer, said four metal layers having vertically aligned openings, said water drainage means including a hollow rivet extending through said aligned openings and having a top flange pressing against a top surface of the top metal layer and a bottom flange pressing against a bottom surface of the bottom metal layer.

8. A muffler as set forth in claim 5 wherein said water drainage means comprises a melted metal bond uniting all the metal layers to each other, said vertical hole being formed in a central part of said bond.

9. A muffler as set forth in claim 8 wherein said melted metal bond comprises a spot weld forming a cylindrical plug, said vertical hole comprising a drilled hole in the spot weld formed plug.

10. A muffler as set forth in claim 8 wherein said melted metal bond comprises a laser fused sleeve and said vertical hole comprises a laser-burned hole inside the sleeve.

11. An exhaust gas muffler comprising an outer housing having opposite ends and first and second longitudinal sides extending between said ends, said housing having an inlet at one end and an outlet at the other end for exhaust gas and gas passage means in the housing for the passage of gas from the inlet to the outlet, said gas passage means comprising upper and lower plates having troughs therein, said upper and lower plates having longitudinal side edges, said troughs in said plates providing an inlet passage for exhaust gas to extend between the plates, said troughs in said plates providing an outlet passage for exhaust gas to extend between the plates, said outer housing comprising upper and lower sections formed and shaped to define a resonator chamber and an expansion chamber, said upper and lower plates being supported on said housing sections, said inlet passage comprising a first straight section connected to said inlet and located adjacent the first longitudinal side of the housing and including an inwardly offset portion, said first section and said offset portion being located in said expansion chamber, said inlet passage including a second straight section extending from the offset portion and parallel to the first straight section and opening into said resonator chamber, said upper and lower housing sections including a first channel portion formed therein and connecting the expansion and resonator chambers, said second straight section fitting in said first channel portion, said inlet passage including a discharge section extending transversely inwardly from the first straight section and opening into the expansion chamber, said outlet passage having a first straight section connected to said outlet and located adjacent the second longitudinal side of the housing and having a first inwardly offset portion extending from the first straight section, said first straight section of said outlet passage and said first inwardly offset portion of said outlet passage being located in the resonator chamber, said outlet passage including a second straight section parallel to the first straight section and extending at one end from an innermost part of said first inwardly offset portion and a second offset portion having an innermost part extending from the other end of the second straight section, said outlet passage including a third straight section extending from an outermost part of the second offset portion and located adjacent the second longitudinal side of the housing, said second offset portion and said third straight section of the outlet passage being located in the expansion chamber, said third straight section of the outlet passage being open in said expansion chamber to receive gas flow from the discharge section of the inlet passage, said upper and lower housing sections including a second channel portion formed therein and connecting the expansion and resonator chambers, said second straight section of said outlet passage fitting in said second channel portion.

12. A muffler as set forth in claim 11 wherein an outside space between the first and second channel portions of the upper housing section forms a pocket apt to collect water in use of the muffler, said muffler having water drainage means for draining water from said pocket including a vertical hole extending through the upper and lower housing sections and through the upper and lower plates, said water drainage means providing for sealing of the plates and housing sections at said hole and serving to secure the housing sections and plates together.

13. A muffler as set forth in claim 12 wherein the lower housing section has condensate pocket means for collecting condensate formed in a bottom portion thereof in at least the resonator chamber and a hole in the pocket means to allow condensate collecting therein to drain out of the condensate pocket means.

14. A muffler as set forth in claim 11 wherein the lower housing section has condensate pocket means for collecting condensate formed in at least the bottom of the resonator chamber and a hole in the pocket means to allow condensate collecting therein to drain out of the condensate pocket means.

15. An exhaust muffler comprising an outer housing having opposite ends and first and second longitudinal sides extending between said ends, said housing having an inlet and an outlet for exhaust gas, gas passage means in the housing for the passage of gas from the inlet to the outlet, said gas passage means comprising at least one plate having longitudinal side edges, said outer housing comprising upper and lower sections formed and shaped to define a first chamber and a second chamber longitudinally separated from the first chamber and to have longitudinal side edges, the longitudinal side edges of said plate fitting between and being supported by the longitudinal side edges of the upper and lower housing sections, said plate having troughs defining said gas passage means and having a first straight section and a second straight section parallel to the first straight section and extending longitudinally of the plate, said upper and lower housing sections including a first channel portion connecting the first and second chambers, said first straight section fitting in said first channel portion, said upper and lower housing sections including a second channel portion spaced from the first channel portion and connecting the first and second chambers, said second straight section fitting in said second channel portion, the space between the first and second channel portions of the upper housing section on a top portion thereof forming a pocket capable of collecting water in use of the muffler, and water drainage means for draining water from said pocket including a verticle hole through the upper and lower housing sections and said plate.

16. A muffler as set forth in claim 15 including condensate collection and drainage means formed in the lower housing section in a bottom portion of the first and second chambers.

* * * * *